United States Patent [19]

Bindl et al.

[11] Patent Number: 5,399,652
[45] Date of Patent: Mar. 21, 1995

[54] CROSSLINKABLE COMPOSITION BASED ON AMINOSILICONE

[75] Inventors: Johann Bindl, Burghausen, Germany; Kiyoshi Ninomiya, Tokyo; Izura Taketa, Osaka, both of Japan

[73] Assignee: Wacker-Chemie GmbH, Munich, Germany

[21] Appl. No.: 31,411

[22] Filed: Mar. 15, 1993

[30] Foreign Application Priority Data

Apr. 3, 1992 [DE] Germany .................... 4211256

[51] Int. Cl.$^6$ ............................................. C08G 77/22
[52] U.S. Cl. ...................................... 528/26; 528/38; 528/41; 427/387; 524/838
[58] Field of Search ............... 427/387; 528/38, 41, 528/26; 524/838

[56] References Cited

U.S. PATENT DOCUMENTS

| | | | |
|---|---|---|---|
| 4,359,545 | 11/1982 | Ona et al. | 524/262 |
| 4,496,687 | 1/1985 | Okada et al. | 524/859 |
| 4,661,577 | 4/1987 | Jo Lane et al. | 528/10 |
| 4,680,366 | 7/1987 | Tanaka et al. | 528/27 |
| 4,757,121 | 7/1988 | Tanaka et al. | 528/27 |
| 4,795,680 | 1/1989 | Rich et al. | 428/450 |
| 4,978,561 | 12/1990 | Cray et al. | 427/387 |
| 5,015,700 | 5/1991 | Herzig et al. | 525/487 |
| 5,017,297 | 5/1991 | Spyropoulos et al. | 252/8.8 |
| 5,039,738 | 8/1991 | Czech | 524/838 |
| 5,272,222 | 12/1993 | Okinoshima et al. | 525/431 |
| 5,302,659 | 4/1994 | Bindl et al. | 524/838 |

FOREIGN PATENT DOCUMENTS

| | | |
|---|---|---|
| 0095676 | 12/1983 | European Pat. Off. . |
| 0114636 | 8/1984 | European Pat. Off. . |
| 0342830 | 11/1989 | European Pat. Off. . |
| 0342834 | 11/1989 | European Pat. Off. . |
| 0349753 | 1/1990 | European Pat. Off. . |
| 0349754 | 1/1990 | European Pat. Off. . |
| 0358329 | 3/1990 | European Pat. Off. . |
| 0399706 | 11/1990 | European Pat. Off. . |
| 41379 | 2/1987 | Japan . |
| 47371 | 2/1990 | Japan . |

*Primary Examiner*—John C. Bleutge
*Assistant Examiner*—Margaret W. Glass
*Attorney, Agent, or Firm*—Martin Connaughton

[57] ABSTRACT

A crosslinkable composition comprising (A) an organopolysiloxane which has at least one monovalent SiC-bonded radical containing primary and/or secondary amino groups, and (B) a crosslinking component selected from an alkoxysilane and/or siloxane which contains at least one carboxylic acid anhydride group. The crosslinkable composition and/or the resultant organopolysiloxane compound obtained from the reaction of organopolysiloxane (A) and crosslinking component (B) can be used to treat organic fibers and textile structures produced therefrom.

11 Claims, No Drawings

CROSSLINKABLE COMPOSITION BASED ON AMINOSILICONE

The invention relates to a crosslinkable composition and more particularly to a crosslinkable organopolysiloxane composition containing an organopolysiloxane having amino groups. The crosslinkable composition and its reaction product can be used in particular as textile finishing agents.

BACKGROUND OF THE INVENTION

Organopolysiloxanes containing amino groups have been used heretofore as textile finishing agents. Good soft handle effects are obtained with the textiles treated with these agents. However, the amino-functional group —$(CH_2)_3NHCH_2CH_2NH_2$ preferably used heretofore shows a strong tendency towards thermal yellowing, a discoloration of the treated fibers which is accelerated by elevated temperature.

The reduction of thermal yellowing by reaction of the organopolysiloxane comprising amino groups with organic epoxides is described, for example, in EP-A-399 706 (S. E. Cray el al., published Nov. 28, 1990 for Dow Corning Ltd., Great Britain). However, the effect achieved in this manner is not sufficient.

A more effective manner of achieving a reduction in thermal yellowing is by reacting with acylating agents, such as carboxylic acids and anhydrides thereof, such as described in, for example, EP-A-349 753 and EP-A-349 754 (M. Ozaki et al., published on Jan. 10, 1990 for Toray Silicone Co., Ltd., Japan). Further acylating agents for reducing thermal yellowing are lactones, the use of which for modifying aminosilicone textile treatment agents is disclosed in, inter alia, EP-A-342 830 and EP-A-342 834 (S. E. Cray et al., published on May 5, 1989 for Dow Corning Ltd., Great Britain), carbonates, the use of which is disclosed in JP-A-90/47371 (S. Yokoyama et al., published Feb. 16, 1990 for Kyoeisha Yushi K.K. AG, Japan) and oxalic acid esters, the use of which is disclosed in U.S. Pat. No. 5,039,738 (A. M. Czech; issued Aug. 13, 1991 for Union Carbide Corp., USA).

However, the acylating agents reduce the soft handle effect of the treated textiles, especially in the case of high degrees of acylation.

In addition to the soft handle effect, a few desirable properties of the treated textiles, such as resilience and crease recovery, are improved by the elastomeric properties of the aminosilicone textile treatment agents.

The use of epoxy-functional trialkoxysilanes as crosslinking components in an aminosilicone textile treatment agent is disclosed in EP-A-358 329 (K. Spyropolous; published Mar. 14, 1990 for Dow Corning Ltd., Great Britain). The use of epoxy-functional silanes and additionally organic epoxides is described in U.S. Pat. No. 4,757,121 (M. Tanaka et al., published Jul. 12, 1988 for Shin-Etsu Chemical Co., Japan). An elastomeric character of the textile treatment agents is indeed obtained in both cases, but the reduction in thermal yellowing is not sufficient.

The reaction of an organopolysiloxane comprising amino groups with acetic anhydride and epoxy-functional silanes is disclosed in JP-A-87/41379 (T. Yasukawa et al., published Feb. 23, 1987 for Nikka Chemical Industry Co., Ltd.). The resulting amino-silicone textile treatment agents are, however, only a compromise solution between good crosslinkability and reduction in thermal yellowing since the epoxy-functional silane makes only little contribution to the reduction in thermal yellowing and acetic anhydride makes no contribution to crosslinkability.

Therefore, it is an object of the present invention to provide a crosslinkable composition containing an organopolysiloxane having amino groups. Another object of the present invention is to provide a crosslinkable composition containing an organopolysiloxane having amino groups which can be used as a textile finishing agent. Still another object of the present invention is to provide a crosslinkable organopolysiloxane composition containing an organopolysiloxane having amino groups from which a textile finishing agent can easily be prepared. A further object of the present invention is to provide a crosslinkable composition containing an organopolysiloxane having amino groups which provides good crosslinkability and good reduction in thermal yellowing.

SUMMARY OF THE INVENTION

The foregoing objects and others which will become apparent from the following description are accomplished in accordance with this invention, generally speaking, by providing a crosslinkable composition comprising (A) an organopolysiloxane which has at least one monovalent SiC-bonded radical containing primary and/or secondary amino groups, and (B) a crosslinking component selected from the group consisting of an alkoxysilane, a siloxane and mixtures thereof having at least one carboxylic acid anhydride group.

DESCRIPTION OF THE INVENTION

Since the crosslinking component (B) effectively reduces the thermal yellowing of the organopolysiloxane composition obtained from the crosslinkable composition of this invention; it is possible to eliminate the use of an acylating agent. In addition, in the case of amino-functional silicone plasticizers the hydrophilic character and stability to alkali can be improved by the use of the crosslinking component (B) of this invention.

In the composition, preferably, the organopolysiloxane (A) has at least one siloxane unit of the general formula

$$R_a^1 Q_b SiO_{\frac{(4-a-b)}{2}} \qquad (I)$$

and all other siloxane units have the general formula

$$R_c^1 SiO_{\frac{(4-c)}{2}} \qquad (II)$$

in which $R^1$ may be the same or different, represents monovalent $C_1$ to $C_{18}$ hydrocarbon radicals, monovalent $C_1$ to $C_{18}$ hydrocarbon radicals which are substituted by fluorine, chlorine or bromine atoms, hydrogen atoms, $C_1$ to $C_{12}$ alkoxy radicals or hydroxyl radicals or alkyl glycol radicals, Q represents a group of the general formula

$$-R^5-[^{NR2}(CH_2)_m]_d NHR^2 \qquad (III)$$

in which $R^5$ represents a divalent $C_1$ to $C_{18}$ hydrocarbon radical, $R^2$ represents a hydrogen atom or a $C_1$ to $C_{18}$ hydrocarbon radical or a fluorine-, chlorine- or bromine-substituted $C_1$ to $C_{18}$ hydrocarbon radical, a has the value of 0, 1 or 2, b has the value of 1, 2 or 3, c has the value 0, 1, 2 or 3, d has the value of 0, 1, 2, 3 or 4, m has the value of 2, 3, 4, 5 or 6 and the sum of a+b is no more than 4.

Examples of $C_1$ to $C_{18}$ hydrocarbon radicals are alkyl radicals, such as the methyl, ethyl, n-propyl, iso-propyl, n-butyl, iso-butyl, tert-butyl, n-pentyl, iso-pentyl, neopentyl or tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; cycloalkyl radicals, such as cyclopentyl, cyclohexyl or cycloheptyl radicals and methylcyclohexyl radicals; aryl radicals, such as the phenyl radical and the naphthyl radical; alkaryl radicals, such as o-, m-and p-tolyl radicals, xylyl radicals and ethylphenyl radicals; and aralkyl radicals, such as the benzyl radical and the α- and the β-phenylethyl radical.

The above hydrocarbon radicals $R^1$ optionally contain an aliphatic double bond. Examples are alkenyl radicals, such as the vinyl, allyl, 5-hexen-1-yl, E-4-hexen-1-yl, Z-4-hexen-1-yl, 2-(3-cyclohexenyl)-ethyl and cyclododeca-4,8-dienyl radical. Preferred radicals $R^1$ containing an aliphatic double bond are the vinyl, allyl and 5-hexen-1-yl radical.

Preferably, however, not more than about 1% of the hydrocarbon radicals $R^1$ contain a double bond.

Examples of $C_1$ to $C_{18}$ hydrocarbon radicals substituted by fluorine, chlorine or bromine atoms are the 3,3,3-trifluoro-n-propyl radical, the 2,2,2,2',2',2'-hexafluoroisopropyl radical, the heptafluoroisopropyl radical and the o-, m- and p-chlorophenyl radical.

Examples of divalent $C_1$ to $C_{18}$ hydrocarbon radicals represented by $R^5$ are saturated straight-chain or branched or cyclic alkylene radicals, such as the methylene and ethylene radicals and also propylene, butylene, pentylene, hexylene, 2-methylpropylene, cyclohexylene and octadecylene radicals, or unsaturated alkylene or arylene radicals, such as the hexenylene radical and phenylene radicals, in which the n-propylene and the 2-methylpropylene radicals are particularly preferred.

The alkoxy radicals are alkyl radicals described above, bonded via an oxygen atom. The examples cited for the alkyl radicals also apply to the alkoxy radicals $R^1$.

The alkyl glycol radicals represented by $R^1$ preferably have the general formula

  (IV)

in which $R^2$, $R^5$ and d are the same as above, n has the value of 1 to 100 and $R^{10}$ represents a hydrogen atom, a radical $R^2$ or a group of the general formula

where $R^7$ represents the radical $R^2$, or O—$R^2$.

In the above general formulas (I) to (IV) $R^1$ preferably represents a methyl, phenyl, $C_1$ to $C_3$ alkoxy or hydroxyl radical or a radical of the general formula (IV), $R^5$ preferably represents a divalent $C_2$ to $C_6$ hydrocarbon radical, $R^2$ preferably represents a hydrogen atom or a methyl radical, a preferably represents the value of 0 or 1, b preferably represents the value of 1, c preferably represents the value of 2 or 3 and d preferably represents the value of 1.

Straight-chain polydimethylsiloxanes, which optionally have $C_1$ to $C_3$ alkoxy or hydroxyl end groups, are particularly preferred. In these polymethylsiloxanes Q preferably represents a $H_2N(CH_2)_2NH(CH_2)_3$— or $H_2N(CH_2)_2NHCH_2CH(CH_3)CH_2$— group.

The ratio of the siloxane units of general formula (I) to the siloxane units of general formula (II) is preferably from 1:10 to 30000, and in particular from 1:20 to 300. The amine contents are preferably 0.001 to 2 meq/g, and in particular from 0.1 to 1.0 meq/g, measured as consumption of 1N hydrochloric acid in ml/g organopolysiloxane (A) on titration to the neutral point.

It is possible to use only one type of organopolysiloxane (A) or a mixture of at least two or more different types of organopolysiloxane (A).

The organopolysiloxane (A) or a mixture of at least two or more different types of organopolysiloxane (1) preferably has an average viscosity of from 50 to 100000 mPa.s, and more particularly from 100 to 10000 mPa.s, at 25° C.

The siloxane which is effective as crosslinking component (B) preferably contains at least one siloxane unit of general formula

  (V)

and all other siloxane units have the general formula

  (VI)

in which $R^1$, a, b and c are the same as above, Z is an anhydride-functional group of the general formula

  (VII)

in which $R^8$ represents a radical $R^2$, or the two $R^8$ radicals together with the carbon atoms to which they are bonded form a cyclic hydrocarbon radical having from 5 to 15 ring atoms, which is bonded to the silicon atom via a divalent radical $R^9$, x and y each have the value of 0 or 1, $R^9$ represents a divalent $C_1$ to $C_6$ hydrocarbon radical or a chemical bond and $R^5$ and $R^2$ are the same as above.

Preferably, the siloxane which is effective as crosslinking component (B) contains more than one anhydride-functional group or has at least one $C_1$ to $C_{12}$ alkoxy radical or hydroxyl radical in addition to an anhydride-functional group.

The alkoxysilane which is effective as crosslinking component (B) preferably has the general formula

  (VIII)

in which Z, $R^1$ and b are the same as above, with the proviso that at least one radical $R^1$ represents a $C_1$ to $C_{12}$ alkoxy radical.

Examples of anhydride-functional groups of general formula (VII) in which the two $R^8$ radicals together with the carbon atoms to which they are bonded form a cyclic hydrocarbon radical are

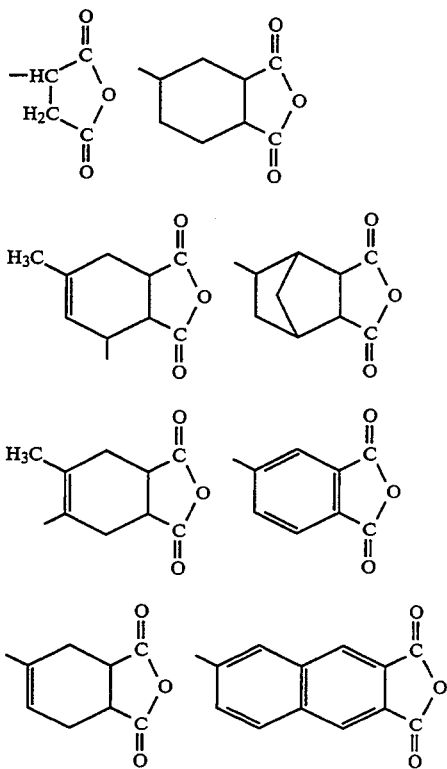

Silanes of general formula

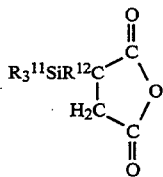

(IX)

in which $R^{11}$ represents a $C_1$ to $C_6$ alkoxy radical, and in particular a methoxy or ethoxy radical, and $R^{12}$ represents a straight-chain $C_2$ to $C_6$ alkylene radical are particularly preferred.

The preparation of the alkoxysilanes and siloxanes comprising at least one carboxylic acid anhydride group is disclosed in, for example, EP-A-114 636 (T. Lindner et al., published Aug. 1, 1984 for Wacker Chemie GmbH, Munich), DE-A-39 27 312 (C. Herzig et al., published Feb. 21, 1991 for Wacker Chemie GmbH, Munich) and U.S. Pat. No. 4,634,755 (J. E. Hallgren et al., issued Nov. 6, 1987 for General Electric Co., USA).

In addition to organopolysiloxane (A) and alkoxysilane and/or siloxane (B) containing a carboxylic acid anhydride group, as the crosslinking components, the crosslinkable composition of this invention may also contain (C) an acylating agent known per se.

Since the crosslinking components (B) also reduce thermal yellowing in the same manner as conventional acylating agents, the ratio of acylating agent (C), to crosslinking component (B) can be arbitrarily selected without having to accept changes in respect of thermal yellowing. Thus, the degree of crosslinking can be adjusted without affecting the thermal yellowing. Conversely, minimum thermal yellowing can be obtained with a chosen degree of crosslinking. Textile finishing agents which have the desired hydrophilic character and stability to alkali can also be obtained by the combination of crosslinking component (B) with acylating agent (C).

Suitable acylating agents are, for example, carboxylic acids and their anhydrides, the use of which for the modification of aminosilicone textile treatment agents is disclosed in, inter alia, JP-A-57/101076 (K. Kodera et al., published on Jun. 23, 1982 for Nikka K.K. Co., Ltd. Japan), EP-A-349 753 and EP-A-349 754 (M. Ozaki et al., published on Jan. 10, 1990 for Toray Silicone Co., Ltd., Japan).

Particularly suitable compounds are (a) monofunctional carboxylic acids and anhydrides thereof having the general formulas $R^2$—COOH, $R^2$—O(CH$_2$CH-R$_2$O)$_e$R$^5$—COOH, [$R^2$—CO]$_2$O and [$R^2$—O(CH$_2$CH-R$_2$O)$_e$R$^5$—CO]$_2$O, in which $R^2$ and $R^5$ are the same as above and e has a value of from 0 to 100. Mixed anhydrides of two different carboxylic acids are also suitable. The carboxylic acids and anhydrides of the following general formulas H(CH$_2$)$_f$—COOH and [H(CH$_2$)$_f$CO]$_2$O, in which f has a value from 1 to 19, and also H(CH$_2$)$_g$O(CH$_2$CH$_2$O)$_g$CH$_2$—COOH and [H(CH$_2$)$_g$O(CH2CH20)$_g$CH$_2$—CO]$_2$O in which g has a value of from 1 to 20, are preferably used. Acetic anhydride is particularly preferred.

Other suitable compounds are (b) difunctional carboxylic acids and cyclic anhydrides thereof of the general formulas HOOC—$R^5$—COOH, HOOC—R-$^5$O(CH$_2$CHR$_2$O)$_e$R$^5$—COOH and

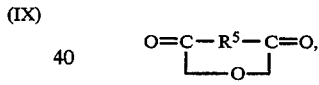

in which $R^2$, $R^5$ and e are the same as above. The difunctional carboxylic acids and cyclic anhydrides thereof having the following general formulas HOOC—(CH$_2$)$_k$—COOH and

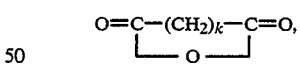

in which k has the value of from 2 to 8, and also HOOC—CH$_2$—(OCH$_2$CH$_2$)$_e$OCH$_2$—COOH and

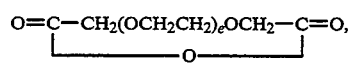

in which e is the same as above, can preferably be employed. Succinic anhydride and maleic anhydride are especially preferred.

Additional suitable acylating agents are, for example, lactones, the use of which for modifying aminosilicone textile treatment agents is described in, inter alia, EP-A-342 830 and EP-A-342 834 (S. E. Cray et al., published on May 5, 1989 for Dow Corning Ltd., Great Britain).

Lactones and lactides of the general formulas

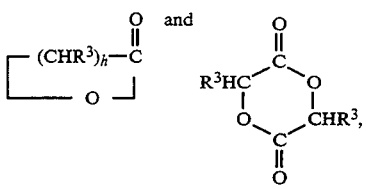

in which $R^3$ represents a monovalent $C_1$ to $C_{18}$ hydrocarbon radical, which is optionally substituted by one or more hydroxyl groups, or a hydrogen atom or a hydroxyl radical and h has a value of from 2 to 7, are preferred. Particularly preferred are γ-Butyrolactone, δ-gluconolactone and the lactide of lactic acid.

Still other suitable acylating agents are (c) carbonates, the use of which for modifying aminosilicone textile treatment agents is described in JP-A-90/47371 (S. Yokoyama et al., published on Feb. 16, 1990 for Kyoeisha Yushi K.K. AG, Japan).

Carbonates of the general formulas

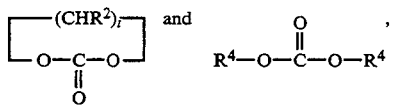

in which $R^2$ represents a hydrogen atom or a $C_1$ to $C_{18}$ hydrocarbon radical which is optionally substituted by flourine, chlorine or bromine, i has the value of 2 or 3 and $R^4$ represents optionally a fluorine-, chlorine- or bromine-substituted $C_1$ to $C_{18}$ hydrocarbon radical or a group of the general formula

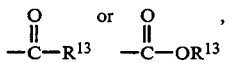

in which $R^{13}$ is an optionally fluorine-, chlorine- or bromine-substituted $C_1$ to $C_{18}$ hydrocarbon radical, are especially preferred.

Cyclic carbonates, such as ethylene carbonate, propylene carbonate and trimethylene carbonate, and also dimethyl dicarbonate of the formula

are particularly preferred.

Additional acylating agents which may be employed are (d) oxalic acid esters, the use of which for modifying aminosilicone textile treatment agents is described in U.S. Pat. No. 5,039,738 (A. M. Czech; issued on Aug. 13, 1991 for Union Carbide Corp., USA). The dimethyl ester, diethyl ester and the diverse isomeric dipropyl esters, dibutyl esters and dipentyl esters of oxalic acid are preferred.

In addition to organopolysiloxane (A), the crosslinking component (B) comprising an alkoxysilane and/or siloxane containing a carboxylic acid anhydride group, and acylating agent (C), the crosslinkable composition of this invention may also contain additional crosslinking components. Suitable components are, for example, the epoxy-functional silanes and siloxanes disclosed in EP-A-358 329 (K. Spyropolous; published on Mar. 14, 1990 for Dow Corning Ltd., Great Britain) and U.S. Pat. No. 4,757,121 (M. Tanaka et al., issued on Jul. 12, 1988 for Shin-Etsu Chemical Co., Ltd., Japan). Additional crosslinking agents which may be employed are trialkoxysilanes or tetraalkoxysilanes or partial hydrolysis products thereof.

The crosslinkable composition of this invention contains preferably from 1 to 150 mol %, and more preferably from 10 to 90 mol % of anhydride-functional groups in crosslinking component (B) and 0 to 150 mol %, and more preferably from 20 to 90 mol %, of functional groups in the acylating agent (C) based on the amine groups in organopolysiloxane (A). The sum of (B) and (C) is preferably from 1 to 150 mol %, and more preferably from 30 to 100 mol %.

The crosslinkable composition of this invention can arbitrary contain catalysts known per se for the condensation reaction of condensable groups, such as alkoxy groups, bonded directly to the silicon. Examples of such condensation catalysts are, in particular, carboxylic acid salts of tin or zinc, in which hydrocarbon radicals may be bonded directly to tin, such as di-n-butyltin dilaurate, tin octoates, di-2-ethyltin dilaurate, di-n-butyltin di-2-ethylhexoate, di-2-ethylhexyltin di-2-ethylhexoate, dibutyltin diacylates or dioctyltin diacylates, in which the acylate groups are derived from alkanoic acids having from 3 to 16 carbon atoms per acid, in which at least two of the valencies of the carbon atom bonded to the carboxyl group are saturated by at least two carbon atoms other than that of the carboxyl group, and zinc octoates. Additional examples of catalysts (3) are alkoxy titanates, such as butoxy titanates and triethanolamine titanate, and also zirconium compounds and aluminum compounds, and in particular their carboxylic acid salts and alcoholates.

The condensation catalyst is preferably used in amounts of from 0 to 10% by weight, based on the sum of organopolysiloxane (A), crosslinking component (B) and, where appropriate, acylating agent (C).

The crosslinkable composition of this invention, or the organopolysiloxane compound obtained by reaction of the composition, can be in the form of an emulsion or microemulsion, in particular if it is to be used as a textile treatment agent. Preferably, the mixture or the reaction product of organopolysiloxane (A), crosslinking component (B) and, where appropriate, acylating agent (C) constitutes a discontinuous oil phase in a continuous aqueous phase (oil-in-water emulsion).

The weight ratios of the discontinuous oil phase and the continuous aqueous phase can be varied within wide ranges. As a rule, the proportion of oil phase is from 5 to 60% by weight, preferably from 10 to 40% by weight, based on the total weight of the emulsion. The emulsifier content is preferably in the range of from 5 to 100% by weight, and more preferably from 10 to 50% by weight, based on the weight of the oil phase.

Suitable anionic emulsifiers are, in particular:

1. Alkyl sulfates, especially those which have a chain length of from 8 to 18 C atoms, and alkyl ether sulfates which have 8 to 18 C atoms in the hydrophobic radical and 1 to 40 ethylene oxide (EO) or propylene oxide (PO) units.
2. Sulfonates, in particular alkylsulfonates having from 8 to 18 C atoms, alkylarylsulfonates having from 8 to 18 C atoms, taurides and esters and halfesters of sulfosuccinic acid with monohydric alcohols or alkylphenols having from 4 to 15 C atoms; in which the alcohols or alkylphenols can optionally be ethoxylated with from 1 to 40 EO units.

3. Alkali metal salts and ammonium salts of carboxylic acids having from 8 to 20 C atoms in the alkyl, aryl, alkaryl or aralkyl radical.
4. Phosphoric acid partial esters and their alkali metal salts and ammonium salts, and in particular alkyl phosphates and alkaryl phosphates having from 8 to 20 C atoms in the organic radical and alkyl ether-phosphates and alkaryl ether-phosphates having from 8 to 20 C atoms in the alkyl or alkaryl radical and from 1 to 40 EO units.

Suitable nonionic emulsifiers are, in particular:
1. Alkyl polyglycol ethers, preferably those having from 8 to 40 EO units and alkyl radicals of from 8 to 20 C atoms.
2. Alkylaryl polyglycol ethers, preferably those having from 8 to 40 EO units and from 8 to 20 C atoms in the alkyl and aryl radicals.
3. Ethylene oxide/propylene oxide (EO/PO) block copolymers, preferably those having from 8 to 40 EO and PO units.
4. Fatty acids having from 6 to 24 C atoms.
5. Natural substances and their derivatives, such as lecithin, lanolin, saponins and cellulose; cellulose alkyl ethers and carboxyalkylcelluloses, in which the alkyl groups each have up to 4 carbon atoms.
6. Straight-chain organo(poly)siloxanes containing polar groups, and in particular those containing alkoxy groups having up to 24 C atoms and/or up to 40 EO and/or PO groups.

Suitable cationic emulsifiers are, in particular:
1. Salts of primary, secondary and tertiary fatty amines having from 8 to 24 C atoms with acetic acid, sulfuric acid, hydrochloric acid and phosphoric acids.
2. Quaternary alkylbenzeneammonium salts, in particular those in which the alkyl group has from 6 to 24 C atoms, and in particular the halides, sulfates, phosphates and acetates.
3. Alkylpyridinium, alkylimidazolinium and alkyloxazolinium salts and in particular those in which the alkyl chain has up to 18 C atoms, especially the halides, sulfates, phosphates and acetates.

Additional suitable emulsifiers which may employed in the preparation of the emulsions are fatty acid polyglycol esters, polyethoxylated fatty acid glycerides and sorbitan esters, alkyl polyglycosides, fatty acid alkylolamides, alkyl ether-carboxylic acids, alkaryl ether-carboxylic acids, ethoxylated quaternary ammonium salts, amine oxides, betaines, sulfobetaines and sulfosuccinates.

Mixing of reaction components (A) organopolysiloxane, (B) crosslinking component and, where appropriate, (C) acylating agent can be carried out in any order. The reactive components will react on mixing at room temperature (RT), therefore raising the temperature to accelerate the reaction is possible, however, it is not necessary. When an acylating agent (C) is used, the organopolysiloxane (A) is preferably first reacted with the acylating agent (C) at room temperature to 180° C. and the crosslinking component (B) is then added at room temperature to 50° C. A catalyst is usually not required when reacting components (A) organopolysiloxane, (B) crosslinking component and, where appropriate, (C) acylating agent. The reaction times are usually in the range of from a few minutes, for example in the case of carboxylic acid anhydrides, to a few hours, for example in the case of lactones and carbonates.

When preparing an emulsion or microemulsion, mixing or reaction of components (A) organopolysiloxane, (B) crosslinking component and, where appropriate (C) acylating agent can be carried out before, during or after the emulsifying process in which admixing with the aqueous phase and the emulsifier is carried out. The emulsifying process can be carried out in a manner known for the emulsification of organopolysiloxanes, in particular in accordance with the process described in EP-A-442 098 (K. Huhn et al., published on Aug. 21, 1991 for Wacker-Chemie GmbH, Munich).

The reaction of the crosslinking component (B) with the organopolysiloxane (A) is preferably carried out only during or after the emulsifying process since in the case of complete reaction of components (A) and (B) prior to the emulsifying process, in particular in the case of a high amine content in (A) and a high mol % proportion of (B), premature crosslinking can occur which, as a consequence of gel formation, makes emulsification more difficult. In particular, the crosslinking component (B) is added during the emulsifying process. The reaction with the organopolysiloxane (A) then takes place during or after the emulsifying process. The reaction of the crosslinking component (B) takes place very selectively with the amino groups of the organopolysiloxane (A) even in the presence of water, so that no particular precautions have to be taken in the case of addition during or after emulsification.

When monocarboxylic acids and/or dicarboxylic acids are used as (C) acylating agents, these are preferably mixed homogeneously with the organopolysiloxane (A) before or during emulsification; hydrophilic ether-carboxylic acids are preferably mixed during or after emulsification. When using monocarboxylic acids, admixing with organopolysiloxane (A) is preferably carried out at 40° to 150° C. In the case of dicarboxylic acids, the procedure is preferably carried out at room temperature in order to avoid viscosities which are too high and admixing is preferably carried out during the emulsification process. The monocarboxylic acids and/or dicarboxylic acids used form amido groups with the amino groups of organopolysiloxane (A) at an elevated temperature, which is either already obtained during admixing with organopolysiloxane (A) or is obtained when finishing textile substrates.

Open-chain and cyclic anhydrides will react at room temperature with the amino groups of the organopolysiloxane (A) to form amido groups, both in the absence and in the presence of water. Therefore, the reaction with organopolysiloxane (A) is carried out by adding, and homogeneously mixing in, the anhydrides during or after the emulsification process. Especially when cyclic anhydrides are employed and organopolysiloxane (A) has a high amine content, it is generally preferred to carry out the addition during or after the emulsification process in order to avoid viscosities which are too high.

When the (C) acylating agents used are lactones, the latter are preferably reacted with the organopolysiloxane (A) prior to the emulsification step in which amido groups are formed by the reaction with the amino groups of (A). The reaction itself can be carried out under diverse conditions, depending on the reactivity of the lactones used. The reaction is preferably carried out at elevated temperature, with the use of inert solvents, such as toluene, chlorinated hydrocarbons or ketones, if appropriate.

When the (C) acylating agents used are carbonates, the latter are preferably reacted with the organopolysiloxane (A) prior to the emulsifying process, the amino groups of (A) being converted to carbamate groups. The reaction conditions depend on the reactivity of the carbonates used. For example, with dimethyl dicarbonate, which is highly reactive, a complete conversion can already be achieved by mixing at room temperature, whereas the cyclic carbonates are preferably reacted at temperatures of from 40° to 120° C., and in particular from 60° to 90° C. If appropriate, inert solvents can also be used. By-products which may be formed during the reaction, such as $CO_2$ and methanol in the case of dimethyl dicarbonate, can easily be removed by distillation, if desired.

The acylation of organopolysiloxane (A) is preferably carried out by emulsifying organopolysiloxane (A) and reacting it, during or after the emulsification process, with one of the carboxylic acids described above, or anhydrides thereof.

This emulsion or microemulsion is very stable on storage, readily dilutable and resistant to alkali. An emulsion or microemulsion of an organopolysiloxane compound which is very suitable as a textile treatment agent is obtained by reaction with crosslinking component (B).

For specific purposes, such as, for example as a textile treating agent, the crosslinkable composition of this invention may contain additives in addition to the above constituents. Suitable additives are, for example, biocides, such as fungicides, bactericides, algicides and microbicides, thickeners, antifreezes, antistatic agents, colorants, flameproofing agents and organic plasticizers.

The crosslinkable composition of this invention or the reaction product obtained from organopolysiloxane (A), crosslinking component (B) and, where appropriate, acylating agent (C) can be used in the treatment of organic fibers, such as filaments and yarns, and textile structures produced therefrom, such as nonwovens, mats, hanks and woven or knitted textiles, which have been or could have been possible to impregnate heretofore with organosilicon compounds. Examples of fibers which may be impregnated are for example, those composed of keratin, in particular wool, polyvinyl alcohol, copolymers of vinyl acetate, cotton, rayon, hemp, natural silk, polypropylene, polyethylene, polyester, polyurethane, polyamide, cellulose and mixtures of at least two such fibers. As can be seen from the above list, the fibers can be of natural or synthetic origin. The textiles can be in the form of fabric webs or articles of clothing or parts of articles of clothing.

In the case of keratin, especially wool, shrinkage as a result of felting can be prevented by impregnation with the crosslinkable composition used as textile treatment agent, or a reaction product thereof, in particular, if the keratin has been pretreated with chlorine, rinsed and neutralized.

The crosslinkable composition of this invention or the reaction product can be applied to the fiber to be impregnated, or the textile structure, in undiluted form or in the form of solutions in organic solvents or preferably in the form of aqueous emulsions or microemulsions. The emulsions can, if necessary, be further diluted to a suitable concentration prior to use. In the application, other additives, such as organic plasticizers, wax dispersions and additional catalysts, and in particular condensation catalysts, can be added to the crosslinkable composition.

The crosslinkable composition of this invention or the reaction product thereof can be applied to the fibers and textile structures to be impregnated in any desired manner which is suitable for the impregnation of fibers. Suitable methods for impregnating fibers are, for example, drawing, dipping, spreading, casting, spraying, including spraying from an aerosol pack, rolling on, padding or printing.

Preferably, the crosslinkable composition of this invention or the reaction product thereof is applied in amounts such that the increase in weight of the fiber as a result of this composition, minus the diluent which is optionally present, is from 0.1 to 10% by weight, and more preferably from 0.5 to 4% by weight, based on the weight of the fiber.

Crosslinking of the composition of this invention, or of the reaction product thereof, on the fiber can take place at room temperature. Crosslinking can be accelerated by heating to, for example, 50° to 250° C., and in particular 100° to 180° C., in which heating is preferably carried out for from 10 seconds to about 10 minutes.

The fibers and textile structures treated with the crosslinkable composition of this invention, or the reaction product thereof, have a pleasant soft handle, are particularly resistant to thermal yellowing, have high resilience and good crease recovery (stretchable properties), are stable to washing and soil-repellent (show good soil-release properties) and are not hydrophobic or have only a slight hydrophobic character.

In the following examples all parts and percentages are by weight unless otherwise specified.

Examples 1 through 6 describe intermediates for the examples of this invention.

EXAMPLE 1

Under a nitrogen blanketing gas, 40 ml of toluene and 167 g of an amino-functional silicone oil (A) of the formula (titratable amine content $=0.6$ meq/g)

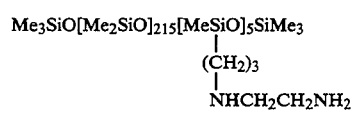

were initially introduced and 9 g of trioxadecanoic acid were metered in, with stirring. The reaction mixture was then heated at 130° C. for 2 hours in a water separator and finally the volatile components were removed at 140° C. under a high vacuum. A slightly yellowish silicone oil with a viscosity of 3000 mm$^2$/s (at 25° C.) and a titratable amine content of 0.3 meq/g was obtained.

EXAMPLE 2

Under a nitrogen blanketing gas, 222 g of an amino functional silicone oil (B) of the following formula (titratable amine content$=0.45$ meq/g)

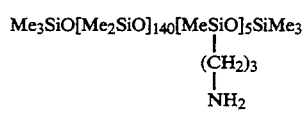

were initially introduced and 4.7 g of γ-butyrolactone were added. The reaction mixture was heated at 120° C. for 5 hours, with stirring, and after cooling a slightly yellowish silicone oil having a viscosity of 10,500 mm²/s (25° C.) and a titratable amine content of 0.23 meq/g was obtained.

EXAMPLE 3

About 167 g of the amino-functional silicone oil (A) prepared in Example 1 were heated together with 7.2 g of lactide for 1 hour at 80° C., with stirring and under a nitrogen blanketing gas. After cooling, a colorless silicone oil having a viscosity of 25,000 mm²/s (25° C.) and a titratable amine content of 0.28 meq/g was obtained.

EXAMPLE 4

About 167 g of an amino-functional silicone oil (C) of the following formula (titratable amine content=0.6 meq/g)

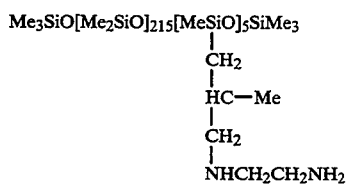

were initially introduced under a nitrogen blanketing gas. After adding 2.2 g of ethylene carbonate, the reaction mixture was heated at 80° C. for 2 hours, with stirring. After cooling, a colorless silicone oil with a viscosity of 3200 mm²/s (25° C.) and a titratable amine content of 0.44 meq/g was obtained.

EXAMPLE 5

Under a nitrogen blanketing gas, 334 g of an amino functional silicone oil (D) of the following formula (titratable amine content=0.3 meq/g)

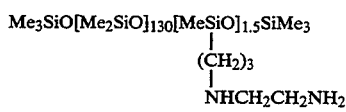

were initially introduced and 11.5 g of the anhydride-functional silane of the following structure (silane GF 20 from Wacker-Chemie GmbH)

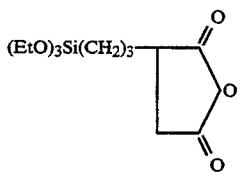

were added slowly at room temperature with stirring.

After stirring for 30 minutes, the viscosity increased slightly and the titratable amine content fell to 0.42. On contact with air, the resulting colorless silicone oil crosslinked in a thin layer even at room temperature within a few hours to form a tack-free rubber film.

EXAMPLE 6

About 15 g of the anhydride-functional silane described in Example 5 were added to a nonionic 35% strength water-in-oil (W/O) emulsion which comprised 235 g of an amino-functional silicone oil (E) of the following formula (titratable amine content=0.52 meq/g)

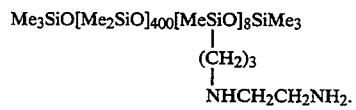

After stirring for 30 minutes at room temperature the titratable amine content of the resulting silicone oil fell to 0.16 meq/g. When applied in a thin layer, the resulting emulsion crosslinked after evaporation of the water to give a tack-free rubber film.

Examples 7 to 15 describe the preparation of aqueous (micro)emulsions which can be used as textile treatment agents.

EXAMPLE 7

About 170 parts by weight of an amino-functional silicone oil (F) having the following formula (titratable amine content =0.3 meq/g)

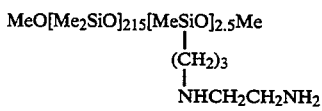

were mixed with 60 parts by weight of nonionic emulsifier Genapol®X060 (isotridecyl alcohol polyglycol ether comprising 6 ethylene oxide units from Hoechst AG) and with 7.7 parts by weight of the silane GF 20 and 60 parts by weight of water were then incorporated using a high-speed mixer. The resultant emulsion concentrate is then diluted with 702 parts by weight of water.

EXAMPLE 8

About 170 parts by weight of an amino-functional silicone oil (G) having the following formula (titratable amine content =0.68

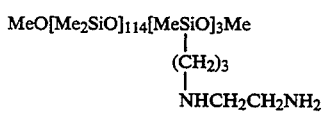

were admixed with 60 parts by weight of nonionic emulsifier Genapol®X060, 3.6 parts by weight of acetic anhydride and 9 parts by weight of the silane GF 20 (see Example 5). An emulsion concentrate was prepared by emulsifying with 60 parts by weight of water and then the concentrate was diluted with 697 parts by weight of water.

EXAMPLE 9

About 170 parts by weight of the amino-functional silicone oil (A) (Example 1) were admixed with 60 parts by weight of emulsifier Genapol®X060, 5.1 parts by weight of acetic anhydride and 6.0 parts by weight of the silane GF 20 (Example 8). An emulsion concentrate was prepared by emulsifying with 60 parts by weight of water and the concentrate was then diluted with 699 parts by weight of water.

EXAMPLE 10

Example 9 was repeated except that 3.7 g of acetic anhydride were substituted for 5.1 parts by weight of acetic anhydride and 12 g of silane GF 20 were substituted for 6.0 parts by weight of silane GF 20.

EXAMPLE 11

About 173.6 parts by weight of the reaction product prepared in Example 2 were mixed with 60 parts by weight of emulsifier Genapol®X060 and 3 parts by weight of silane GF 20 and the mixture was emulsified with 60 parts by weight of water to form a concentrate. The concentrate was then diluted with 703 parts by weight of water.

EXAMPLE 12

About 180 parts by weight of the reaction product prepared in Example 1 were mixed with 60 parts by weight of emulsifier Genapol®X060 and 6 parts by weight of silane GF 20. The mixture was emulsified with 60 parts by weight of water to form a concentrate and the concentrate was then diluted with 694 parts by weight of water.

EXAMPLE 13

About 177 parts by weight of the reaction product prepared in Example 3 were mixed with 60 parts by weight of emulsifier Genapol®X060 and 6 parts by weight of silane GF 20. The mixture was emulsified with 60 parts by weight of water to form a concentrate and the concentrate was then diluted with 697 parts by weight of water.

EXAMPLE 14

About 173 parts by weight of the reaction product prepared in Example 4 were mixed with 60 parts by weight of emulsifier Genapol®X060 and with 12 parts by weight of silane GF 20. The mixture was emulsified with 60 parts by weight of water to form a concentrate and the concentrate then diluted with 695 parts by weight of water.

EXAMPLE 15

Example 8 was repeated except that 4.7 parts by weight of dimethyl dicarbonate and 12 parts by weight of silane GF 20 were substituted for 3.6 parts by weight of acetic anhydride. Examples 16 to 18 describe comparison examples in accordance with the prior art.

EXAMPLE 16

About 170 parts by weight of the amino-functional silicone oil (A) were admixed with 4 parts by weight of acetic acid and 60 parts by weight of Genapol®X060. The mixture was emulsified with 60 parts by weight of water to form a concentrate. The concentrate was then diluted with 706 parts by weight of water.

EXAMPLE 17

About 6 parts by weight of glycidoxypropyltrimethoxysilane were added to 170 parts by weight of the amino-functional silicone oil (F) and the mixture was heated at 90° C. for 1 hour with stirring and under a nitrogen blanketing gas. After cooling to room temperature, the reaction product was emulsified with 60 parts by weight of Genapol®X060 and 60 parts by weight of water to form a concentrate. The concentrate was then diluted with 704 parts by weight of water.

EXAMPLE 18

About 170 parts by weight of the amino-functional silicone oil (A) were heated with 4 parts by weight of acetic anhydride and 5 parts by weight of glycidoxypropyltrimethoxysilane for 1 hour at 90° C. After cooling to room temperature, an emulsion concentrate was prepared using 60 parts by weight of Genapol®X060 and 60 parts by weight of water and the concentrate was then diluted with 701 parts by weight of water.

EXAMPLE 19

Application assessments of the emulsions prepared in Examples 7 through 18:

19(a)—stability to alkali/shear stability:

The emulsions to be tested were diluted with water to a solids content of 0.6% and the pH value was adjusted to 9 using dilute aqueous potassium hydroxide solution. The test solutions prepared in this manner were then tested to determine their shear stability by using a homomixer at 8000 rpm for 3 minutes. The appearance after the shear test was assessed, the following ratings were used:

A: Appearance unchanged, no oil spots.
B: Slight oil spots on the surface.
C: Several more pronounced oil spots on the surface.

19(b)—textile finishing:

The emulsions to be tested were diluted with water to a solids content of 0.5% and applied to white cotton knitted fabric by dipping and then compressed to remove the excess. The knitted fabric was compressed in such a manner that a liquid uptake of 75% with respect to the cotton weight, was obtained. The cotton knitted fabrics impregnated in this manner were then dried for 5 minutes at 110° C. and 3 minutes at 150° C. and subjected to the following application tests:

Assessment of handle

The assessment was carried out by a manual test in accordance with a relative scale from 0 to 10, the value of 10 representing the best soft handle.

Yellowing

The degree of yellowing was determined using a color measuring instrument (color meter TC-P III from Tokyo Denshoku Co., Ltd.). The measured yellowing index was compared with the untreated sample as reference and recorded as $\Delta YI$: $\Delta YI = YI$ (sample) $- YI$ (reference) Decreasing yellowing signified lower $\Delta YI$ values.

Crease recovery angle

The measurements were carried out in accordance with DIN 53890 and were then assessed within a relative scale from 0 to 5, with the crease recovery angles increasing from 0 to 5.

TABLE 1

| Emulsion from Example | Stability to alkali/shear stability | Soft handle | Yellowing YI | Crease recovery angle |
|---|---|---|---|---|
| 7 | A | 8 | +0.2 | 5 |
| 8 | A-B | 6 | +1.9 | 4 |
| 9 | B | 10 | +0.4 | 4 |
| 10 | A | 8 | +0.4 | 5 |
| 11 | B | 9 | +0.3 | 4 |
| 12 | A-B | 6 | +1.0 | 3 |
| 13 | A-B | 9 | +0.6 | 4 |
| 14 | A | 7 | +0.8 | 5 |
| 15 | A | 7 | +1.2 | 4 |
| 16 | C | 10 | +3.6 | 2 |
| 17 | C | 8 | +1.6 | 4 |
| 18 | B-C | 7 | +2.1 | 3 |
| Untreated | — | 0 | 0 | 0 |

What is claimed is:

1. A crosslinkable composition comprising (A) an organopolysiloxane which has at least one siloxane unit of the general formula

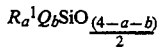 (I)

and all other siloxane units have the general formula

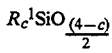 (II)

in which $R^1$ represents a monovalent $C_1$ to $C_{18}$ hydrocarbon radical or a monovalent $C_1$ to $C_{18}$ hydrocarbon radical which is substituted with a fluorine, chlorine or bromine atom, a hydrogen atom, a $C_1$ to $C_{12}$ alkoxy radical or hydroxyl radical or an alkyl glycol radical, Q represents a group of the general formula

 (III)

in which $R^5$ represents a divalent $C_1$ to $C_{18}$ hydrocarbon radical, $R^2$ represents a hydrogen atom or a $C_1$ to $C_{18}$ hydrocarbon radical or a $C_1$ to $C_{18}$ hydrocarbon radical substituted with a fluorine, chlorine or bromine atom, a has a value of 0, 1 or 2, b has a value of 1, 2 or 3, c has a value 0, 1, 2 or 3 d has a value of 0, 1, 2, 3 or 4, m has a value of 2, 3, 4, 5 or 6 and the sum of a +b is no more than 4 and (B) an alkoxysilane having at least one carboxylic acid anhydride group as a crosslinking component.

2. The composition of claim 1, wherein the alkoxysilane crosslinking component (B) has the general formula

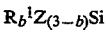 (VIII)

in which Z is an anhydride-functional group of the general formula

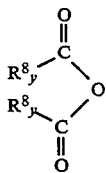 (VII)

in which $R^1$ represents a monovalent $C_1$ to $C_{18}$ hydrocarbon radical or a monovalent $C_1$ to $C_{18}$ hydrocarbon radical which is substituted with a fluorine, chlorine or bromine atom, a hydrogen atom, a $C_1$ to $C_{12}$ alkoxy radical or hydroxyl radical or an alkyl glycol radical and b has the value of 1, 2 or 3, with the proviso that at least one radical $R^1$ represents a $C_1$ to $C_{12}$ alkoxy radical, the two $R^8$ radicals together with the carbon atoms to which they are bonded form a cyclic hydrocarbon radical having from 5 to 15 ring atoms, which is bonded to the silicon atom via a divalent radical $R^9$, where $R^9$ represents a divalent $C_1$ to $C_6$ hydrocarbon radical or a chemical bond, and y has a value of 1.

3. The composition of claim 1, wherein the composition contains in addition to organopolysiloxane (A) and an alkoxysilane crosslinking component (B) containing a carboxylic acid anhydride group, there is also present (C) an acylating agent.

4. The composition of claim 1, wherein the composition is in the form of an emulsion or microemulsion.

5. An organopolysiloxane compound which is obtained by thermally reacting the composition of claim 1.

6. An organopolysiloxane compound which is obtained by thermally reacting the composition of claim 3.

7. A process for treating organic fibers and textile materials produced therefrom which comprises applying the crosslinkable composition of claim 1 to the organic fibers.

8. A process for treating organic fibers and textile materials produced therefrom which comprises applying the crosslinkable composition of claim 3 to the organic fibers.

9. A process for treating organic fibers and textile materials produced therefrom which comprises applying the organopolysiloxane compound of claim 5 to the organic fibers.

10. A process for treating organic fibers and textile materials produced therefrom which comprises applying the organopolysiloxane compound of claim 6 to the organic fibers.

11. A process for treating organic fibers and textile materials produced therefrom which comprises applying an emulsion prepared by reacting
 (A) an organopolysiloxane having at least one monovalent SiC-bonded radical containing primary and/or secondary amino groups, with
 (B) an alkoxysilane crosslinking component having at least one carboxylic acid anhydride group and
 (C) an acylating agent before, during or after formation of the emulsion;
to the organic fibers.

* * * * *